United States Patent [19]

Locke et al.

[11] 3,922,256
[45] Nov. 25, 1975

[54] POLYMER TREATMENT PROCESS

[75] Inventors: John Michael Locke, Lyndhurst;
Martin Viney, Highcliffe, both of
England

[73] Assignee: The International Synthetic Rubber Co., Ltd., England

[22] Filed: Jan. 19, 1973

[21] Appl. No.: 324,970

[30] Foreign Application Priority Data
Jan. 21, 1972 United Kingdom............... 3057/72
Oct. 12, 1972 United Kingdom............. 74123/72

[52] U.S. Cl............. 260/80.78; 260/85.3; 260/88.2;
260/93.7; 260/94.9 GC; 260/94.9 H; 260/676 R
[51] Int. Cl.²............................................. C08J 3/08
[58] Field of Search........ 260/94.9 GC, 88.2, 80.78,
260/93.7, 676 R

[56] References Cited
UNITED STATES PATENTS

| | | | |
|---|---|---|---|
| 3,524,826 | 8/1970 | Kresge et al. | 260/5 |
| 3,560,458 | 2/1971 | Kennedy et al. | 260/85.3 |
| 3,660,160 | 5/1972 | Powers et al. | 134/22 |

FOREIGN PATENTS OR APPLICATIONS

| | | |
|---|---|---|
| 1,023,407 | 3/1966 | United Kingdom |
| 989,491 | 4/1965 | United Kingdom |

OTHER PUBLICATIONS

J. P. Kennedy in Polymer Chemistry of Synthetic Elastomers, Part I, (Wiley, 1968), pp. 296–315.
H. S. Makowsk in Polymer Chemistry of Synthetic Elastomers, part II, (Wiley, 1969), pp. 905–937.
J. P. Kennedy in "Polymer Chemistry of Synthetic Elastomers," (1968), (Interscience), pp. 298–310.
H. S. Makowski in "Polymer Chemistry of Synthetic Elastomers," (Interscience, 1968), pp. 929–937.

*Primary Examiner*—Harry Wong, Jr.
*Assistant Examiner*—A. L. Clingman
*Attorney, Agent, or Firm*—Cushman, Darby & Cushman

[57] ABSTRACT

A process for the preparation of an alpha olefin polymer having an intrinsic viscosity of 0.1 to 1.0 measured as a 0.1% by weight solution in toluene at 25°C comprises intimately mixing (A) a solution of a mormally solid alpha olefin polymer containing tertiary carbon atoms in a solvent selected from a hydrocarbon, a halogenated hydrocarbon and mixtures thereof with (B) an aluminium halide selected from aluminium tribromide and ball-milled aluminium trichloride and after reaction recovering the alpha olefin polymer of lowered molecular weight.

16 Claims, No Drawings

POLYMER TREATMENT PROCESS

This invention relates to a process for the treatment of alpha olefin polymers.

Alpha olefin polymers, particularly ethylene/propylene copolymers and terpolymers, are well known materials which are commercially available. Such polymers are generally prepared by polymerisation of the alpha olefin monomer or monomers, optionally with up to 10% by weight of other monomers, to a high molecular weight product which is solid at ambient temperature. The Mooney viscosity of such polymers ($M_L$ 1 + 8 at 250°F) is, for example, in the range 20 to 70. For many applications a normally solid product is undesirable, and the use of a low molecular weight product offers advantages.

We have found that the molecular weight of an alpha olefin polymer containing tertiary carbon atoms may be reduced by a degradation reaction comprising contacting a hydrocarbon solution of a polymer with aluminium tribromide or a very fine dispersion of aluminium trichloride.

According to the present invention, a process for the preparation of an alpha olefin polymer having an intrinsic viscosity of 0.1 to 1.0 measured as a 0.1% by weight solution in toluene at 25°C comprises intimately mixing (A) a solution of a normally solid alpha olefin polymer containing tertiary carbon atoms in a solvent selected from a hydrocarbon, a halogenated hydrocarbon and mixtures thereof, with (B) an aluminium halide selected from aluminium tribromide and ball-milled aluminium trichloride, and after reaction recovering the alpha olefin polymer of lowered molecular weight.

The starting polymer of the process of the present invention generally has an intrinsic viscosity (IV) of more than 1.2 measured as a 0.1% by weight solution in toluene at 25°C. Thus polymers of Mooney Viscosity ($M_L$ 1 + 8 at 250°F) in the range 20 to 70 may readily be used.

Preferably the starting polymer is saturated, e.g. ethylene/propylene copolymer, branched polyethylene or polypropylene, but it may contain a small amount of unsaturation. Thus, polymers having an iodine number of less than 20 may be used. Examples of such unsaturated polymers are ethylene/propylene terpolymers wherein the termonomer is, for example, dicyclo-pentadiene, hexadiene 1,4, ethylidene norbornene or methylene norbornene, or butyl rubber. The polymer is used in the form of a hydrocarbon or halogenated, especially chlorinated, hydrocarbon solution, e.g. in hexane, cyclohexane, chlorobenzene, carbon tetrachloride or mixtures of one or more thereof. Hydrocarbons are preferred. The concentration of the polymer solution may be up to e.g. 25% w/v. Generally, the solution is of concentration 5% to 15% w/v, but at concentrations of above about 10% the solution is very viscous and thus difficult to stir.

The polymer solution is preferably substantially free of moisture, although a moisture content of, e.g., 2 to 30 ppm is normally desirable. Generally, polymer solutions such as are obtained from a polymerisation reaction to a normally solid product, i.e. solid at ambient temperature, contain residual monomers which are desirably removed, for example, by purging with an inert gas such as dry nitrogen.

Aluminium bromide is preferably used as a solution in hydrocarbon or halogenated, especially chlorinated, hydrocarbon solvent, preferably cyclohexane. The concentration of such a solution may be up to e.g. 25% by weight since at about this concentration the solution is saturated. Ball-milled aluminium trichloride may be used, the aluminium trichloride preferably being freshly sublimed prior to ball-milling. The period of ball-milling is preferably 10 to 25 hours or more. The aluminum trichloride is ball-milled as a dispersion preferably in a hydrocarbon as solvent (for the polymer), the concentration of the dispersion being up to e.g. 15% w/v. The amount of aluminium tribromide or ball-milled aluminium trichloride used is e.g. 5 to 50 mmoles per liter of polymer solution, 10 to 20 mmoles per liter generally being sufficient.

Reaction takes place under mild conditions of temperature and pressure, e.g. at temperatures below 100°C and 0–5 atmospheres absolute, and conveniently at atmospheric pressure. Desirably a reaction temperature of at least 30°C is used, 50°–70°C being very convenient. The reaction time is generally a period of hours, e.g. 1 to 5 hours or more, depending on the conditions used and the molecular weight desired in the final polymer.

The rate of reaction may be increased by including in the reaction mixture a cocatalyst for the aluminium tribromide or trichloride, the cocatalyst being one which associates with the aluminium halide used to give rise to a cation, e.g., a carbonium ion. Examples of suitable cocatalysts are hydrogen halides, alkyl halides (e.g. tert. butyl bromide, sec butyl bromide, isopropyl bromide) and isopropyl benzene. Compounds having a branched alkyl group are preferred. Where used the molar ratio of aluminium halide to cocatalyst is e.g. 1:5 to 5:1.

Water, although not a cocatalyst, may be effective as a cocatalyst because of hydrolysis of the aluminium halide used, forming hydrogen halide which is the effective cocatalyst. Where the polymer solution is substantially completely dry, having a water content of e.g. 2 ppm or less, a cocatalyst is normally essential. After reaction and recovery, if required, by e.g. removal of solvent, the polymer has an IV 0.1 to 1.0 measured under the conditions described above. The process of the invention enables the preparation of low molecular weight alpha olefin polymers from normally solid alpha olefin polymers. The process conveniently may be used as a separate stage in the polymerisation plant producing the starting (normally solid) polymer, thus enabling economic production of a range of alpha olefin polymers differing in molecular weight.

The products of the invention may be used as a tackifier, particularly for polymeric materials deficient in tack, as viscosity index improvers for oils, as a plasticiser and as a substrate for further reactions. The process also finds application to remove solid alpha olefin polymer contaminating apparatus, e.g. blocking pipes or adhering to the walls of reactors. Also by mixing alpha olefin polymers of different molecular weights the molecular weight distribution of polymers may be varied.

We have found that a product offering particularly interesting possibilities in a variety of applications may be obtained by halogenating the alpha olefin polymer having an intrinsic viscosity of 0.1 to 1.0 measured as a 0.1% by weight solution in toluene at 25°C which is the product of the process described above (hereinafter called the polymer of lowered molecular weight 1 before or after recovery from solution.)

Where recovery has taken place, the halogenation reaction may be achieved by dissolving the polymer of lowered molecular weight in a solvent which will not be halogenated under conditions of the reaction, and then contacting the solution with halogen. Suitable solvents are carbon tetrachloride, which is preferred, chlorobenzene or trichloroethylene. The purpose of forming the solution is to enable rapid reaction with the halogen which is for example bubbled through. In cases where the polymer of lowered molecular weight is already a mobile liquid, dissolution in a solvent may be unnecessary. Preferably the halogenation is carried out in the same solvent as used to prepare the polymer of lowered molecular weight, i.e., before recovery, obviating the need to isolate this polymer before halogenation. Preferred halogens for the treatment are bromine or chlorine, chlorine being a particularly advantageous reagent. Halogenation preferably takes place at an elevated temperature e.g. 50° to 150°C and is continued until from 25 to 100% halogenation has been achieved (i.e., until 25 to 100 of available C—H bonds have been halogenated). Particularly interesting products are obtained by halogenating to obtain products containing 40 to 75% by weight of chlorine, especially where the polymer of lowered molecular weight has an average molecular weight (by number) of 500 to 30,000.

After halogenation, the halogenated polymer may be recovered by removal of the solvent and is available for use. A convenient method of recovering the halogenated product is to squirt the solution into boiling water and then to remove the water by draining.

Particularly interesting applications of the halogenated polymer lie in the adhesives industry, paint and surface coating applications and in the form of an artificial latex, cord dip to promote adhesion between fibers and other materials, e.g. compounded rubber.

Halogenation of the polymer of lowered molecular weight has been described using halogen and a solution of the product. It will be understood however that the halogenation step is not restricted to this method. Other methods of halogenation may be used effectively if desired.

The following Examples illustrate the invention:

EXAMPLE 1

800 g. ethylene/propylene copolymer rubber (IV of 1.3, measured in toluene at 25°) were dissolved in 16 liters of hexane and the solution was charged into a 5 gallon steel vessel. Dry nitrogen was bubbled through the solution for 16 hours. After this treatment the amount of water present, determined using lithium butyl as a scavenger, was 7 to 9 ppm. 68 g. of aluminium bromide, dissolved in 320ml. of cyclohexane, were then added. The mixture was stirred and heated to 60°, this temperature being reached after 30 minutes. After a total of 3½ hours reaction time, the mixture was cooled and run out of the reaction vessel and allowed to settle for 5 minutes. The supernatant liquid was poured off from the catalyst, which was in sludge form, and stirred for 10 minutes with 45 g. sodium hydroxide dissolved in 1 l. of water. After settling, the hexane solution was decanted and evaporated under reduced pressure. The recovered polymer was a thick, pourable liquid (IV of 0.25).

EXAMPLE 2

Ethylene/propylene rubber, as in Example 1, was purified by passing a solution in hexane down a column of alumina (three-sixteenths inch mesh, heated for 4 hours at 400°C) and stirring the solution with excess acetone. The precipitated polymer was freed from solvent, then dissolved in hexane to give a solution containing 5% w/v rubber. 500 ml. of this solution were placed in a flask and purged with dry nitrogen for 16 hours. After this treatment the amount of water present was about 2 ppm or less. 6 ml. of a hexane suspension of finely ball milled aluminium chloride, containing 0.4 g. solid, were then added, followed by 0.61 g. isopropyl bromide. The ball-milled aluminium trichloride had been prepared separately by ball-milling freshly sublimed $AlCl_3$ in hexane for 24 hours. The mixture was stirred and heated to 60°C for 7 hours. The cooled supernatant liquid was then stirred with 100 ml. of 0.2 molar sodium hydroxide solution. The hexane layer as then evaporated under reduced pressure to give a clear, colourless product of IV of 0.3.

EXAMPLE 3

This example illustrates halogenation of the low molecular weight product.

175g of an ethylene/propylene copolymer having a number average molecular weight of 2,600 and which had been obtained by reaction of a normally solid ethylene/propylene copolymer with aluminium bromide was dissolved in 1,500ml carbon tetrachloride. The solution was heated until it was boiling, and chlorine gas was bubbled through for 7 hours, the apparatus being illuminated by a tungsten lamp. The heat of reaction kept the mixture refluxing gently, without the need for the application of additional heat. The solvent was evaporated to give a chlorinated polymer containing 37% chlorine: it formed tough, rubbery films which adhered strongly to glass.

In another experiment carried out under the above conditions, the chlorine was bubbled in for 9 hours, and the final polymer contained 54% chlorine. It was a hard, brittle resin.

What we claim is:

1. A process for lowering the molecular weight of a normally solid starting polymer containing tertiary carbon atoms selected from the group consisting of (1) a saturated alpha olefin polymer and (2) ethylene-propylene terpolymers having an iodine number of less than 20 wherein the termonomer in the terpolymer is selected from the group consisting of dicyclopentadiene, hexadiene-1,4, ethylidene norbornene and methylene norbornene which comprises intimately mixing (A) a solution of starting polymer in a solvent selected from the group consisting of a hydrocarbon, a halogenated hydrocarbon and mixtures thereof, with (B) an aluminium halide selected from the group consisting of aluminium tribromide and ball milled aluminium trichloride, reacting at a temperature below 100°C and after said reaction recovering the alpha olefin polymer of lowered molecular weight which has an intrinsic viscosity of 0.1 to 1.0 measured as a 0.1% by weight solution in toluene at 25°C.

2. A process according to claim 1 wherein the starting polymer is a saturated alpha olefin polymer.

3. A process according to claim 2 wherein the starting polymer is polyethylene, polypropylene or ethylene-propylene copolymer.

4. A process according to claim 3 wherein the starting polymer is polyethylene.

5. A process according to claim 3 wherein the starting polymer is polypropylene.

6. A process according to claim 1 wherein the starting polymer is an ethylene-propylene terpolymer having an iodine number of less than 20 wherein the termonomer in the terpolymer is selected from the group consisting of dicyclopentadiene, hexadiene-1,4,ethylidene norbornene and methylenenorbornene.

7. A process according to claim 1 wherein the alpha olefin starting polymer has an intrinsic viscosity of at least 1.2 measured as a 0.1% by weight solution in toluene at 25°C.

8. A process according to claim 1 wherein the alpha olefin starting polymer is an ethylene-propylene copolymer.

9. A process according to claim 1 wherein the polymer solution (A) is at a concentration of 5% to 15% w/v.

10. A process according to claim 1 wherein the amount of aluminium halide used is 5 to 50 millimoles per liter of polymer solution (A).

11. A process according to claim 1 wherein the reaction between the polymer solution (A) and the aluminium halide is carried out at a pressure of 0–5 atmospheres absolute.

12. A process according to claim 1 wherein a cocatalyst which gives rise to carbonium ions is included in the reaction mixture.

13. A process according to claim 12 wherein the cocatalyst is an alkyl halide.

14. A process according to claim 1 wherein the aluminium halide used is an aluminium trichloride dispersion prepared by sublimation followed by ball milling in a hydrocarbon for 10 to 25 hours.

15. A process according to claim 1 wherein the alpha olefin polymer of lowered molecular weight is halogenated before or after recovery.

16. A process according to claim 15 wherein the polymer is chlorinated.

* * * * *

UNITED STATES PATENT OFFICE
CERTIFICATE OF CORRECTION

Patent No. 3,922,256                    Dated November 25, 1975

Inventor(s) John Locke and Martin Viney

It is certified that error appears in the above-identified patent and that said Letters Patent are hereby corrected as shown below:

Change Item [30] to read:

--[30] Foreign Application Priority Data

January 21, 1972    Great Britain    3057/72
    October 12, 1972    Great Britain    47123/72 --.

Signed and Sealed this twentieth Day of April 1976

[SEAL]

*Attest:*

RUTH C. MASON
*Attesting Officer*

C. MARSHALL DANN
*Commissioner of Patents and Trademarks*